Dec. 30, 1952   H. J. DE VRIES   2,623,657
PRESSURE COOKER
Filed Aug. 11, 1947
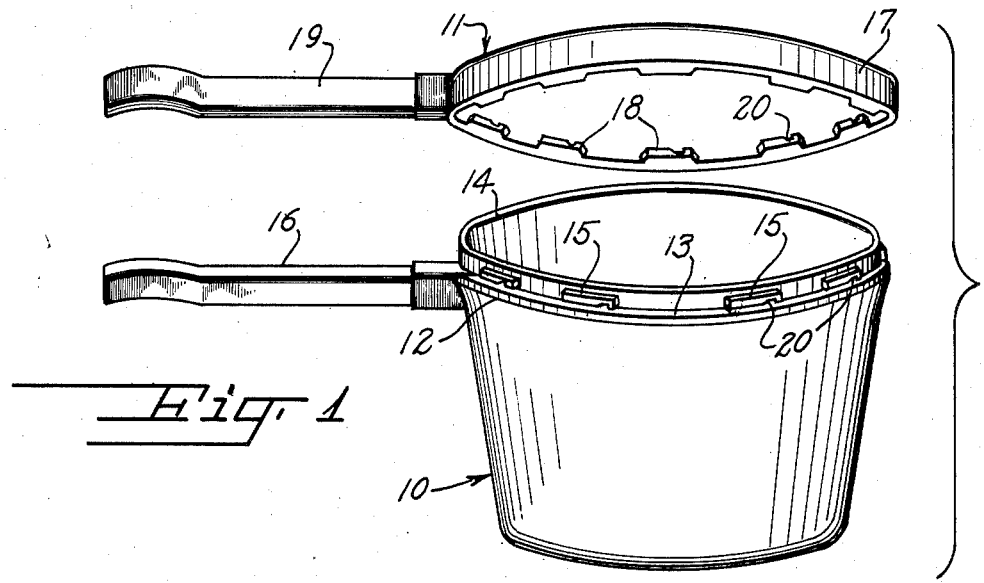
Fig. 1
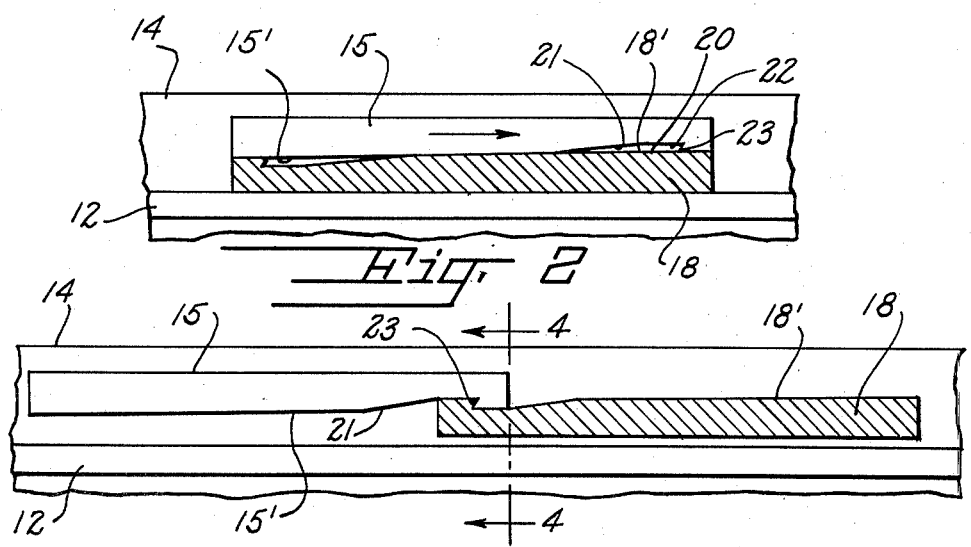
Fig. 2
Fig. 3
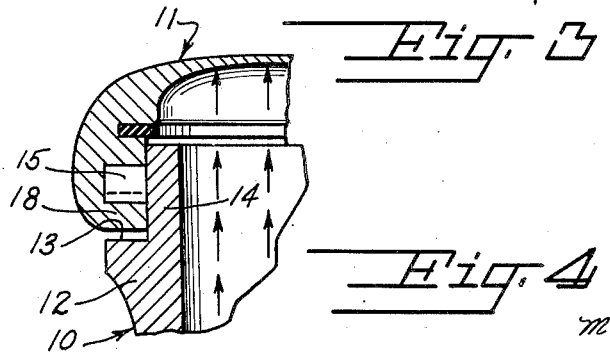
Fig. 4
Inventor
Henry J. de Vries
McMorrow, Berman + Davidson
Attorneys Patented Dec. 30, 1952

2,623,657

UNITED STATES PATENT OFFICE 2,623,657

PRESSURE COOKER

Henry J. de Vries, Farrell, Pa.

Application August 11, 1947, Serial No. 767,929

1 Claim. (Cl. 220—40)

This invention relates to improvements in pressure cookers, and more particularly to an improved safety locking arrangement for pressure cookers to prevent removal of the pressure cooker top while there is steam pressure inside the cooker.

Pressure cookers in the form of sealable metal vessels capable of withstanding several pounds of internal steam pressure have now gone into general use as domestic cooking utensils and are available to the general public. While such utensils have been generally satisfactory, their use has occasioned a large number of accidents resulting in personal injury. Most of these accidents have been caused by breaking the seal between the port portion and the top of such a vessel and removing the top while there is steam under pressure in the vessel. A very small amount of steam pressure is effective to cause serious burns and when the vessel is being used for canning in glass cans or jars, as is frequently the case, the sudden release of steam pressure frequently causes the cans to explode, adding the hot contents of the cans and broken glass to the hazard of the steam.

It is among the objects of the present invention to provide a safety lock feature in the connection between the pot portion and the top of a pressure cooker to positively preclude removal of the top from the pot portion while there is an appreciable amount of steam pressure in the vessel, which locking feature is simple and positive in operation, requires no additional structure nor any substantial modification of the original cooker construction, does not materially increase the manufacturing cost of the pressure cooker, and does not interfere with normal opening of the cooker when there is no internal steam pressure.

Other objects and advantages will become apparent from a consideration of the following description in conjunction with the accompanying drawing, wherein:

Figure 1 is a perspective view of a conventional pressure cooker illustrating the manner of providing a safety locking feature illustrative of the invention to the connecting means between the top and the pot portion of the cooker;

Figure 2 is a somewhat diagrammatic view showing two inter-engaging lugs of the connecting means shaped to provide a safety locking feature illustrative of the invention with the two lugs in position to seal the top to the pot portion of the cooker;

Figure 3 is a diagrammatic view similar to Figure 2 showing the two lugs with the locking feature engaged to prevent removal of the top from the pot portion of the cooker while there is internal pressure in the cooker; and Figure 4 is a transverse cross-section of a fragmentary portion of the cooker illustrative in Figure 1.

With continued reference to the drawing, the pressure cooker comprises a pot portion, generally indicated at 10, and a top, generally indicated at 11. Near its open end the pot portion 10 is provided with a rim or bead 12 providing an external annular shoulder 13 from which extends a substantially cylindrical top rim 14 having a plurality of spaced, elongated lugs 15 on the outer surface thereof, the lugs being spaced from the shoulder 13 for a purpose which will presently appear. A handle 16 extends outwardly from the pot portion 10 below the shoulder 13 for lifting the pot portion and for holding it during rotation of the top 11 relative thereto.

The top 11 has a rounded, annular flange 17 which fits over the rim 14 of the pot portion and is provided with spaced, internal lugs 18 which are operatively engageable with the lugs 15 on the pot portion 10. A handle 19 extends outwardly from the top portion for lifting the top portion and rotating it relative to the pot portion 10.

To secure the top 11 in operative position on the pot portion 10 of the pressure cooker, the top is so positioned over the open top end of the pot portion that the lugs 18 in the top will pass between the lugs 15 on the pot portion. The top is then rotated relative to the pot portion by the handles 16 and 19. As is clearly illustrated in Figures 2 and 3, the lugs 15 and 18 are provided with inclined meeting faces 15' and 18' which act to pull the top down on the pot portion when the top lugs 18 are rotated under the pot portion lugs 15, the top lugs 18 passing between the lugs 15 and the shoulder 13, as is shown in Figure 4.

Preferably a suitable gasket of resilient material is disposed between the top and the pot portion so that when the top is forced downwardly on the pot portion by the inclined meeting faces of the cooperating lugs, a fluid-tight seal is provided between the top and the pot portion.

With the top in sealing association with the pot portion there is a considerable amount of friction between the meeting faces of the cooperating lugs which friction has been relied upon to prevent removal of the top while there is steam pressure in the pressure cooker. While this friction is reasonably effective at extremely high steam pressures to prevent removal of the top, it has been found not to be effective at lower pressures and the tops have frequently been removed while there is sufficient steam pressure in the cookers to cause serious burns.

The present invention contemplates the provision of interengageable shoulders on the cooperating lugs 15 and 18 so disposed that they will be brought into engagement to prevent top removing relative rotation of the top and pot portion as long as there is any appreciable amount of steam pressure in the cooker. To this end, each of the lugs 15 and 18 is provided in its meeting face with a recess 20 providing a transverse shoulder adjacent one end of the lug. These recesses 20 have bottom face portions 21 disposed at a small angle of inclination to the corresponding planes of the meeting faces of the respective lugs 15 and 18 and other bottom face portions 22 substantially parallel to the meeting faces of the corresponding lugs and terminating in respective transverse shoulders 23. Each shoulder 23 is positioned adjacent to one end of the corresponding lug and the straight or parallel bottom face portions 22 have a length substantially equal to the distance between each shoulder and the adjacent end of the corresponding lug. The face of each shoulder 23 is disposed at an acute angle to the meeting face of the corresponding lug and the shoulders are disposed at relatively opposite ends of the lugs 15 and 18 so that, upon relative rotation of the top and pot portions in a direction to free the top, the two shoulders on each pair of cooperating lugs 15 and 18 will be brought into engagement and their inclined or under-cut faces will be interlocked to prevent further rotation of the top relative to the pot portion if there is steam pressure in the cooker, as is particularly shown in Figure 3. The shoulders 23, however, are entirely below the meeting faces of the respective lugs so that when there is no steam pressure in the cooker the shoulders on cooperating lugs 15 and 18 will freely pass each other to permit normal removal of the top from the pot portion of the cooker.

The slightly inclined bottom-face portion 21 of each recess 20 provides a smooth surface for the travel thereon of the shouldered end portion of the opposed lugs so that when the two opposed lugs of each pair are moved relative to each other under pressure conditions, there will be no sudden jar or impact which might damage the lugs and these inclined portions also permit re-closing of the top in the event steam starts to escape between the top and the hot portion when the top is loosened, thereby indicating the presence of steam pressure in the cooker. The straight or parallel bottom-face portion 22 of each recess provides a convenient space for the reception of the shouldered end portion of the opposing lug when the opposed shoulders are in operative engagement, as illustrated in Figure 3.

With the above-described safety locking feature, the top cannot be removed from the pot portion while there is any appreciable amount of steam pressure in the cooker, as a steam pressure of only one pound per square inch will exert a separating force of several hundreds of pounds between the top and the pot portion of the cooker so that the top cannot be forced down to release the shoulders. In the absence of steam pressure in the cooker, the top will stay down of its own weight and the opposed shoulders will freely pass each other to permit normal removal of the top.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In a pressure cooker, a pot portion formed with an upstanding rim having an approximately vertical outer surface terminating in a rim edge; a top applicable to the pot portion and including a depending rim flange having an inner surface engaging said outer surface in the applied position of the top, said inner surface terminating in a flange edge disposed in a plane below the plane of the rim edge in the applied top position; and a series of lugs on each of the rim and flange, the rim lugs extending substantially parallel to the plane of the rim edge and the flange lugs extending substantially parallel to the flange edge, the flange lugs being disposed below the rim lugs in the applied top position to engage the top with the pot portion, said flange and rim lugs being formed with parallel meeting faces fully straight from end to end thereof and inclined obliquely to said planes to provide interengaging cam surfaces tending to urge the top downwardly toward the pot portion to interlock therewith upon rotation of the top in one direction relative to the pot portion, the meeting face of each rim lug having a recess near one end provided with a bottom face portion extending obliquely from said meeting face, a second bottom face portion extending from the first-named bottom face portion and disposed in approximate parallelism with said meeting face, and a stop shoulder at which said second bottom face portion terminates, the stop shoulder being disposed at an acute angle to said meeting face, each flange lug having a recess formed in its meeting face at that end thereof opposite from said end of the meeting face of the rim lug, the recesses of the rim lugs being formed identically to but oppositely from the flange lug recesses, said second bottom face portions being substantially equal in length to the distance between each stop shoulder and the adjacent end of the lug on which said stop shoulder is formed, the stop shoulders of the rim and flange lugs being adapted to prevent complete separation of the top and pot portion by interengagement thereof responsive to rotation of the top in a direction to release the same from the pot portion, under conditions in which steam pressure exists within the pot portion tending to urge the top upwardly from the pot portion.

HENRY J. DE VRIES.

REFERENCES CITED

The following references are of record in the file of this patent:

UNITED STATES PATENTS

| Number | Name | Date |
|---|---|---|
| 495,299 | Calcutt | Apr. 11, 1893 |
| 1,399,345 | Henry | Dec. 6, 1921 |
| 1,576,580 | Ellis | Mar. 16, 1926 |
| 1,716,024 | Bell | June 4, 1929 |
| 1,834,837 | Hashimoto | Dec. 1, 1931 |
| 1,887,700 | Stevens | Nov. 15, 1932 |
| 2,513,350 | Nelson | July 4, 1950 |
| 2,549,387 | Richeson | Apr. 17, 1951 |

FOREIGN PATENTS

| Number | Country | Date |
|---|---|---|
| 19,330 | Great Britain | 1904 |
| 128,108 | Great Britain | June 19, 1919 |
| 261,370 | Great Britain | Apr. 14, 1927 |
| 624,155 | France | Mar. 29, 1927 |